(12) United States Patent
Pelton et al.

(10) Patent No.: US 9,881,391 B2
(45) Date of Patent: Jan. 30, 2018

(54) PROCEDURALLY DEFINED TEXTURE MAPS

(71) Applicant: Microsoft Corporation, Redmond, WA (US)

(72) Inventors: Blake Pelton, Redmond, WA (US); Amar Patel, Kirkland, WA (US); Chas Boyd, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 14/043,928

(22) Filed: Oct. 2, 2013

(65) Prior Publication Data

US 2015/0091931 A1    Apr. 2, 2015

(51) Int. Cl.
  *G06T 11/00*  (2006.01)
  *G06T 15/04*  (2011.01)
  *G06T 15/00*  (2011.01)

(52) U.S. Cl.
  CPC .......... *G06T 11/001* (2013.01); *G06T 15/005* (2013.01); *G06T 15/04* (2013.01)

(58) Field of Classification Search
  CPC ......... G06T 7/40; G06T 7/407; G06T 11/001; G06T 15/04
  See application file for complete search history.

(56) References Cited

U.S. PATENT DOCUMENTS

| | | | |
|---|---|---|---|
| 5,739,818 A | 4/1998 | Spackman | |
| 5,870,509 A | 2/1999 | Alcorn | |
| 6,088,044 A | 7/2000 | Kwok et al. | |
| 6,243,081 B1 | 6/2001 | Goris | |
| 6,252,608 B1 * | 6/2001 | Snyder et al. | 345/473 |
| 6,353,438 B1 | 3/2002 | Van Hook et al. | |
| 7,339,590 B1 | 3/2008 | Moskal et al. | |
| 8,081,184 B1 | 12/2011 | Nordquist | |
| 8,174,534 B2 | 5/2012 | Jiao | |
| 8,400,459 B2 | 3/2013 | Lefebvre et al. | |

(Continued)

OTHER PUBLICATIONS

Ramamoorthi, et al., "An Efficient Representation for Irradiance Environment Maps", In Proceedings of the 28th Annual Conference on Computer Graphics and Interactive Techniques, Aug. 12, 2001, 4 pages.

(Continued)

*Primary Examiner* — Antonio A Caschera
(74) *Attorney, Agent, or Firm* — Patent GC LLC (57) ABSTRACT

A procedural texture relates texel coordinates to color values through an arbitrary function, herein called a texel shader. The procedural texture is defined by a dimension, size, texel format and the texel shader. Texel coordinates are an input to the texel shader, which generates a color value for those texel coordinates. A renderer can be implemented either in hardware, such as part of a graphics processor, or in software as a computer program executed by a processor. The renderer samples from the procedural texture in response to texel coordinates, and evaluates the texel shader on demand. Filtering also can be applied automatically to results. The results of the texel shader invocations are stored in a texture cache to take advantage of spatial and temporal locality. Results are shared among threads, processes and the like through the texture cache.

20 Claims, 5 Drawing Sheets

(56) References Cited

U.S. PATENT DOCUMENTS

| | | | |
|---|---|---|---|
| 8,405,670 B2 | 3/2013 | Mejdrich et al. | |
| 2007/0292047 A1* | 12/2007 | Jiao et al. | 382/279 |
| 2011/0169850 A1* | 7/2011 | Donovan et al. | 345/552 |
| 2012/0320067 A1 | 12/2012 | Iourcha et al. | |

OTHER PUBLICATIONS

"Texture Filtering", Retrieved on: Jul. 26, 2013, Available at: http://en.wikipedia.org/wiki/Texture_filtering.

"Perlin Noise", Retrieved on: Jul. 26, 2013, Available at: http://en.wikipedia.org/wiki/Perlin_noise.

"Shadow Mapping", Retrieved on: Jul. 26, 2013, Available at: http://en.wikipedia.org/wiki/Shadow_mapping.

Fatahalian, et al., "Reducing Shading on GPUs using Quad-Fragment Merging", In Journal of ACM Transactions on Graphics—Proceedings of ACM SIGGRAPH, vol. 29, Issue 4, Jul. 2010, 8 pages.

"Filter Effects", Published on: Aug. 16, 2011, Available at: http://www.w3.org/TR/SVG/filters.html.

Ye, Andy G. and David M. Lewis. "Procedural Texture Mapping on FPGAs", in Proc. of ACM/SIGDA 7 th Intl. Symp. on Field Programmable Gate Arrays , 1999, pp. 112-120.

Luebke, David. "Beyond Programmable Shading: In Action CUDA Fundamentals", Dec. 31, 2008, pp. 1-85, retrieved from http://s08.idav.ucdavis.edu/luebke-cuda-fundamentals.pdf on May 26, 2015.

Farber, Rob. "Running CUDA Code Natively on x86 Processors", Aug. 25, 2011, pp. 1-3, retrieved from http://www.drdobbs.com/parallel/running-cuda-code-natively-on-x86-proces/231500166 on May 26, 2015.

Anonymous. "cbloom rants: Apr. 5, 2012—DXT is not enough—Part 2", May 4, 2012, retrieved from http://cbloomrants.blogspot.nl/2012/04/04-05-12-dxt-is-not-enough-part-2.html on May 26, 2015.

PCT Appl. No. PCT/US2014/058520, International Search Report and Written Opinion, dated Jun. 3, 2015.

"Office Action Issued in European Patent Application No. 14790859.4", dated May 16, 2017, 5 Pages.

* cited by examiner

PROCEDURALLY DEFINED TEXTURE MAPS

BACKGROUND

A "texture map" is well-known concept in computer graphics. A texture map is an array in memory which can be randomly accessed, where each element in the array includes a color value, also called a texel. A texture map is typically two-dimensional, but can be one-dimensional, three-dimensional (i.e., a "volume map") or n-dimensional. Each element of a texture map (i.e., texel) is indexed by a set of "texture coordinates" or vector of size n corresponding to the number of dimensions in the map.

Most graphics processors have support for sampling a texture map to applying the texture map to an object. The object can be a three-dimensional object or a two-dimensional image (of which a computer display screen is a special case). In general, a texture map is defined as an array of color values in memory. When it is sampled, the texels at one or more texture coordinates are accessed from the texture map and combined to produce the desired value. This sampling can be called texture filtering, and enables scaling and interpolation of values at non-integer locations to reduce various artifacts such as blurring, aliasing, blocking and the like. Graphics processors also may provide support for compressed texture maps.

A graphics processor is a parallel processor which performs many concurrent computations in concurrently running threads. Often, the computations being performed by concurrently running threads are identical or nearly identical. This inefficiency is caused by the fact that graphics runtime libraries do not provide an effective mechanism for communication between threads. As an example, a processor can be concurrently computing the colors of multiple texels of an output image. If the output image is of high resolution, then neighboring pixels in the output image may have very similar values.

SUMMARY

This Summary introduces selected concepts in simplified form that are further described below in the Detailed Description. This Summary is intended neither to identify key or essential features of the claimed subject matter, nor to limit the scope of the claimed subject matter.

A procedural texture relates quantized texture coordinates to color values through an arbitrary function, herein called a texel shader. The procedural texture is defined by a dimension, size, texel format and the texel shader. Each invocation of the texel shader with a set of quantized texture coordinates outputs the color value of one texel. In other words, texture coordinates are quantized and input to the texel shader, which generates a color value for those quantized texture coordinates. Such quantized texture coordinates are called "texel coordinates" herein.

An application developer specifies the dimension, size, texel format, and texel shader for a procedural texture. The application developer then programs a renderer to sample from the procedural texture in the same manner that a normal texture map is sampled, including using texture filtering functionality.

A renderer can be implemented either in hardware, such as part of a graphics processor, or in software as a computer program executed by a processor. The renderer samples from the procedural texture in the same manner as in a normal texture map, in response to texel coordinates, but evaluates the texel shader on demand instead of looking up values in an array. Filtering also can be applied automatically to results as with conventional texture maps. The results of the texel shader invocations are stored in a texture cache to take advantage of spatial and temporal locality.

If a procedural texture map is implemented in a graphics processor, then results provided by the texel shader for any given texel coordinates are cached in the graphics processor. The cache in the graphics processor enables results from shaders to be shared among threads executing on the graphics processor.

If a procedural texture map is implemented in a software renderer, then the renderer also can use a cache, such as a software-managed cache or a processor-managed cache, such as a set of physical pages accessed via virtual addressed and managed by a page table.

Thus, when the procedural texture maps are implemented as part of a graphics runtime library, such an implementation exposes data sharing between threads in a way that is easy to use, is scalable across a wide range of implementations, and supports interpolation of results.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
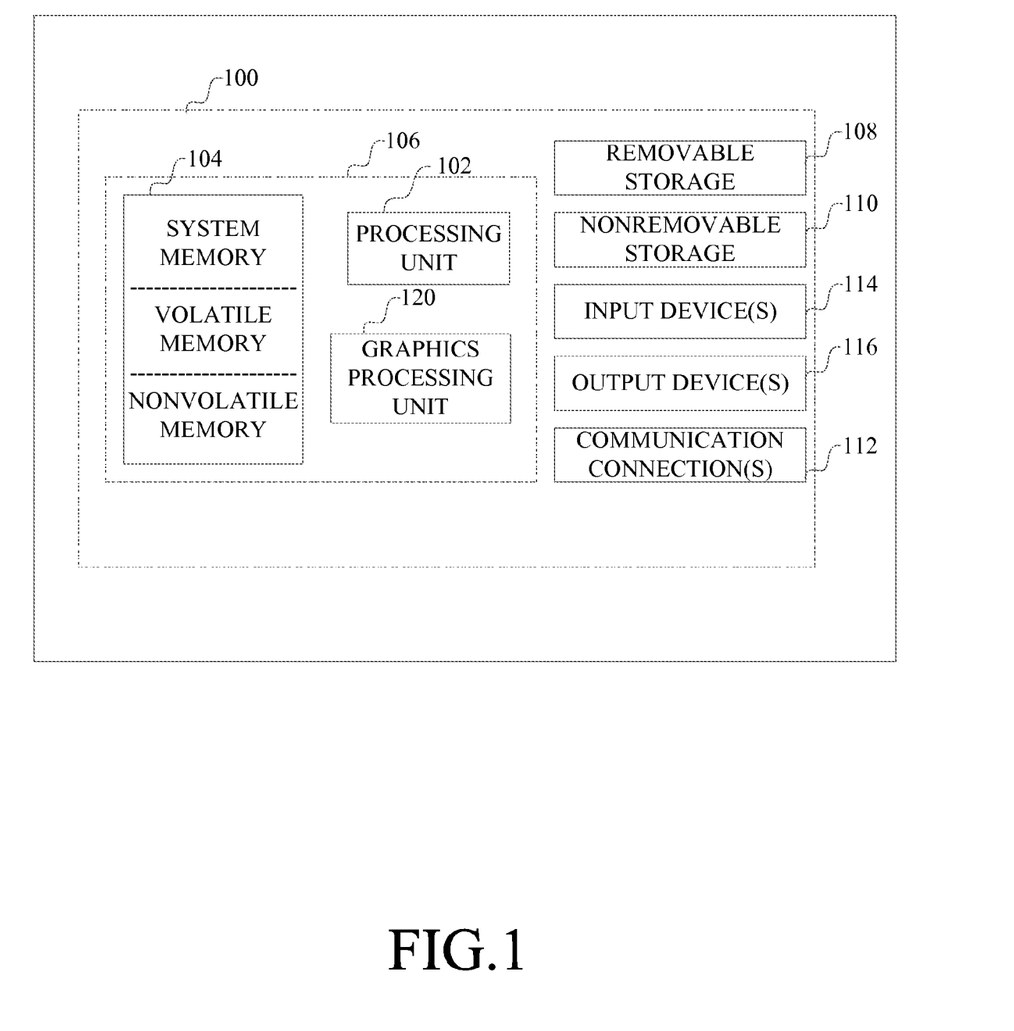
FIG. 1 is a block diagram of an example computer with which components of such a system can be implemented.

FIG. 1 illustrates an example of an example computer in which procedural texture maps can be implemented. This is only one example of a computer and is not intended to suggest any limitation as to the scope of use or functionality of such a computer.

The following description is intended to provide a brief, general description of a suitable computer with which such a system can be implemented. The computer can be any of a variety of general purpose or special purpose computing hardware configurations. Examples of well-known computers that may be suitable include, but are not limited to, game consoles, set top boxes, personal computers, hand-held or laptop devices (for example, media players, notebook computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 1, an example computer 100, in a basic configuration, includes at least one processing unit 102 and memory 104. The computer can have multiple processing units 102. A processing unit 102 can include one or more processing cores (not shown) that operate independently of each other. Additional co-processing units, such as graphics processing unit 120, also are provided. Depending on the configuration and type of computer, memory 104 may be volatile (such as RAM), non-volatile (such as ROM, flash memory, etc.) or some combination of the two. This configuration is illustrated in FIG. 1 by dashed line 106.

The computer 100 may have additional features and functionality. For example, computer 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. A storage medium is any medium in which data can be stored in and retrieved from addressable physical storage locations by the computer.

Computer 100 may also contain communications connection(s) 112 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 112 are devices that interface with the communication media to transmit data over and receive data from communication media, such as a network interface.

Computer 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

A procedural texture map can be implemented on such a computer in a number of different forms. For example, in one implementation, a software-based renderer is a computer program that executes on a central processing unit and that renders images, uses a procedural texture map when sampling a texture. As another example implementation, a graphics processing unit (GPU) includes hardware support for implementing a procedural texture map, in which the GPU implements data structures for supporting procedural texture maps, and has an associated graphics runtime library that implements a procedural texture map for sampling of textures. As another example implementation, a software-based emulator emulates the operation of such a graphical processing unit and corresponding graphics runtime library.

Figure 2:
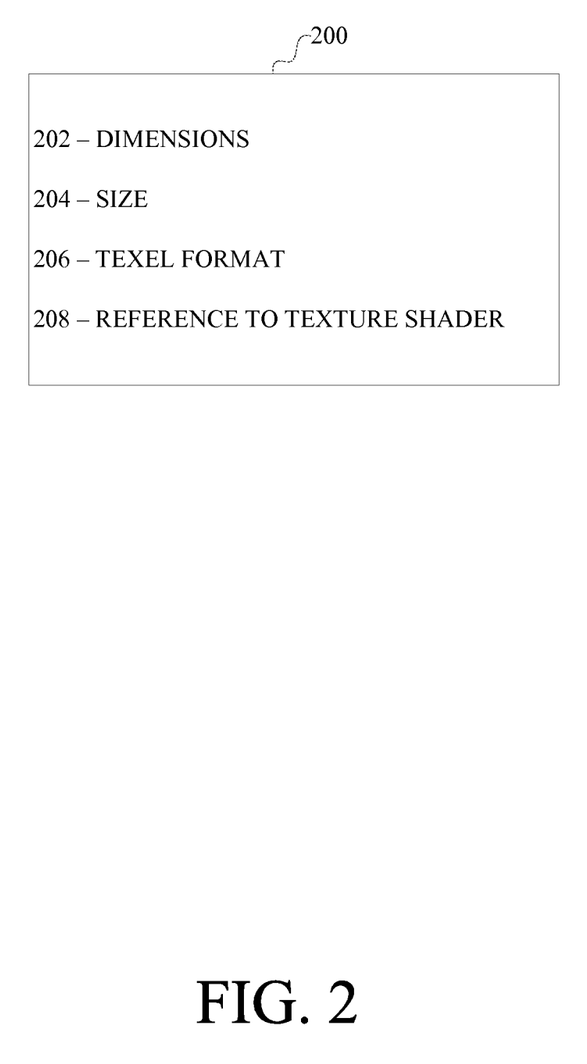
FIG. 2 is a diagram of an example data structure representing a procedural texture.

An example implementation of a data structure for representing a procedural texture map will now be described in connection with FIG. 2. In FIG. 2, a procedural texture map 200 has dimensions 202, size 204, texel format 206 and a reference 208 to a texel shader. The dimensions 202 indicate the whether the texture is one-dimensional, two-dimensional, or n-dimensional. The size 204 indicates the number of texels in each dimension. Optionally, a property indicating the procedural texture is mip-mapped also can be provided. The texel format 206 can be a reference to a complex data structure that provides information about various texel information including, but not limited to, color format, bit depth, and the like. Such a data structure can be implemented in a computer program as part of an object that has associated methods for manipulating the data structure.

If the procedural texture is mip-mapped, an example implementation is to have the texel shader produce texels for arbitrary mip levels. In another example implementation, the GPU or software renderer can automatically produce a mip chain on demand.

The reference 208 identifies the texel shader, i.e., function, that outputs a color value given input texel coordinates. Such a texel shader can be implemented within a graphics runtime library or in another computer program which is then processed into executable code to be run on the graphics processing unit. In one implementation, an application developer uses a shader language, supported by the graphics processing system, to define a texel shader. The texel shader then can be loaded into the graphics processing system when rendering is invoked by the graphics runtime library. Using a cache to share results from the texel shader among threads, the texel shader also is processed upon occurrence of a cache miss.

A graphics runtime library provides support for application developers to specify objects as procedural textures. When an application developer writes a computer program incorporating a procedural texture, the computer program uses the graphics runtime library to interface with a renderer, whether implemented is software or hardware. The graphics runtime library provides support for processing procedural textures, including loading of data structures into memory and cache management.

Figure 3:
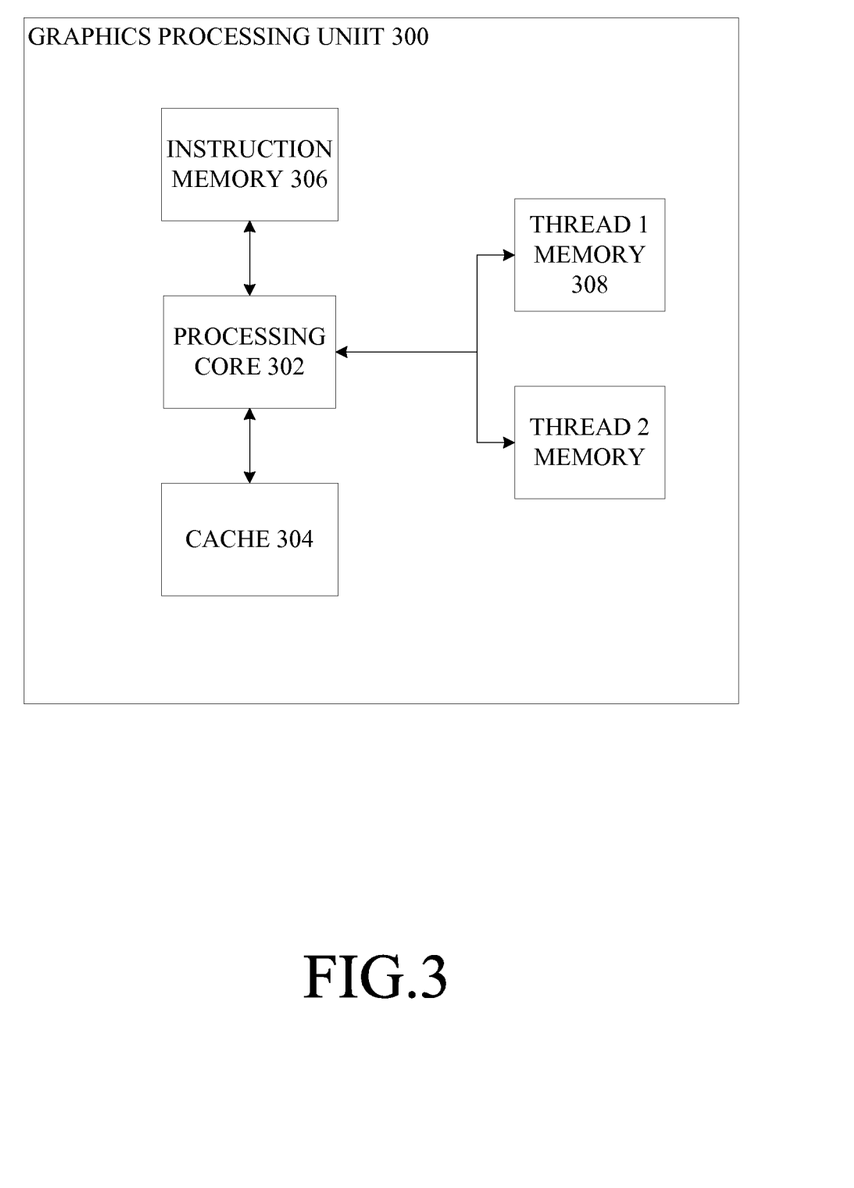
FIG. 3 is a block diagram of an example implementation of a graphic processing unit.

FIG. 3 illustrates an example implementation on graphics processing unit (GPU) implementing a hardware-based renderer supporting procedural textures. Within the GPU 300, a processing core 302 accesses a cache 304. Given a reference to a set of instructions to execute, and parameters for those instructions, the processing core 302 determines if there is a cache hit or miss. If there is a cache miss, the set of instructions are executed and the output color value is added to the cache. The reference to the set of instructions can be, for example, a pointer to instruction memory 306. The set of instructions can be a texel shader. The instruction memory 306 and cache 304 are accessible by all threads running on the processing core 302. Each thread can have dedicated memory 308 in which various data for that thread is stored. For procedural textures, data structures, such as those described above in connection with FIG. 2, for the textures used by those threads are stored in memory 308.

Figure 4:
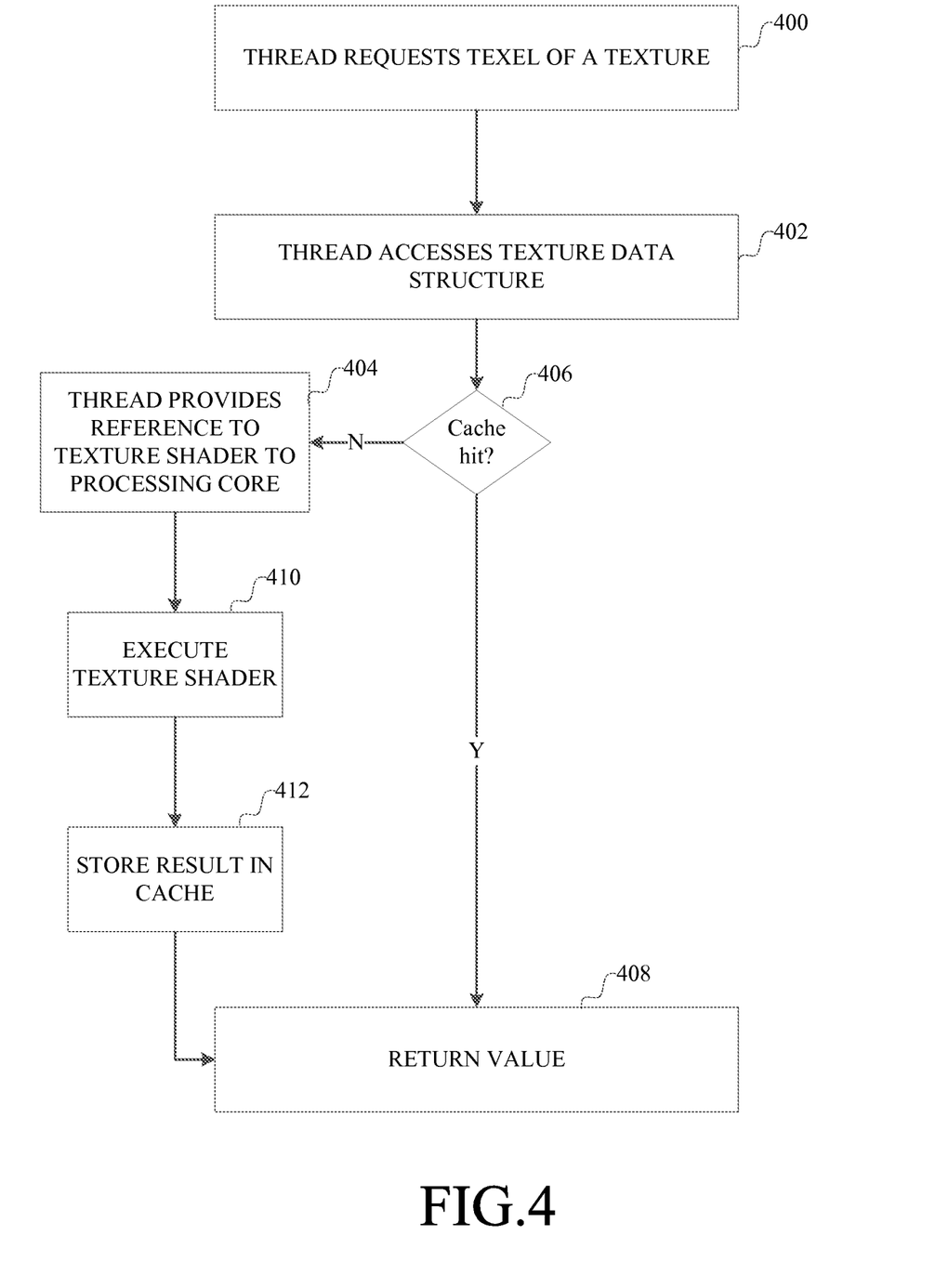
FIG. 4 is a flow chart an example implementation of using a procedural texture with a cache.

A flowchart describing an example implementation of operation of such a graphics processing unit will now be described in connection with FIG. 4. A thread on the graphics processing unit requests 400 a texel from a texture. The thread accesses 402 the data structure for the texture to obtain the reference to the texel shader. The processing core determines 406 if there is a cache hit. If there is a cache hit, a color value is returned 408 to the thread. If there is a cache miss, the thread provides 404 the reference to the texel shader and the parameters to sample the texture to the processing core, and texel shader is executed 410 with the given parameters. The result is stored 412 in the cache and returned 408 to the thread.

Because all threads can access the cache for a given instruction stored in the instruction memory, textures can be readily shared among different threads through the cache. One thread can be used to initialize a texture so that all the texture data is stored in the cache prior to operations occurring for other threads.

An example implementation of a software-based renderer that supports procedural textures will now be described in connection with FIG. 4. In such an implementation, a procedural texture is associated with a cache that can be implemented, for example, in main memory or in a page table managed by the central processing unit. A sampler within the renderer is changed so that, when processing a texel shader, it uses a cache. In particular, a portion of memory is associated with textures 400, which refer to texel shaders 402 also stored in memory. When the sampler accesses a texture, a shader processor 404 accesses a cache 406, and in the event of a cache miss, processes the texel shader.

In one example implementation, the cache can be implemented using CPU page tables. The software renderer allocates virtual address space for the entire procedural texture. Each page is initially marked as inaccessible. When the sampler processes a procedural texture, the first time a page is accessed, the CPU generates a page-fault. The renderer services the page fault by running the texel shader so as to fill the page.

In another example implementation, the cache can be a software managed cache. Such a software managed cache stores sets results of texel shader invocations in cache lines, similar to a hardware cache.

In another implementation, a graphics runtime library can emulate such procedural textures using a renderer, whether implemented in software and hardware, where the renderer does not support procedural textures natively. In such an implementation, each procedural texture is mapped to a physical texture in main memory. The graphics runtime library instructs the renderer to write each texel of the texture into the memory, thus caching texel shader invocations. In another implementation, a simulation of the rendering determines what parts of a texture will be used. Then, the texel shader is processed on those areas of the texture that will be used in a separate rendering pass. A final rendering pass by an application references the areas in the texture that have already been calculated.

The graphics runtime library invalidates the cache as appropriate. In particular, the runtime library tracks when a resource is reading or writing to the cache. A texel shader has various inputs, i.e., parameters, that are the tracked resource. The graphics runtime library tracks when these inputs change, and can invalidate or flush the cache as appropriate.

Given an implementation of a procedural texture, a variety of applications can be provided that use procedural textures.

In general, any application in which processing can be refactored to include a sampling operation on a texture, then the sampling operation can be implemented as a procedural texture. Using a cache allows sharing of the results of that sampling operation among multiple threads or processing pipelines or stages of processing pipelines.

One example application for procedural textures is generating pixels of a display screen. In general, a typical three-dimensional rendering application, such as typically found in game consoles, has a complex function that determines the color of each pixel on a display. To provide visually pleasing outputs, e.g., that do not have artifacts such as blockiness, this function typically is evaluated for every pixel at the display refresh rate. If a term can be evaluated at a lower spatial and/or temporal frequency, such that interpolation provides visually adequate intermediate pixel data, then a procedural texture can be used. By refactoring the application to use a procedural texture, cached values can be used, and, in most rendering engines, pre-existing texture filtering support can be used to implement the interpolation.

Figure 5:
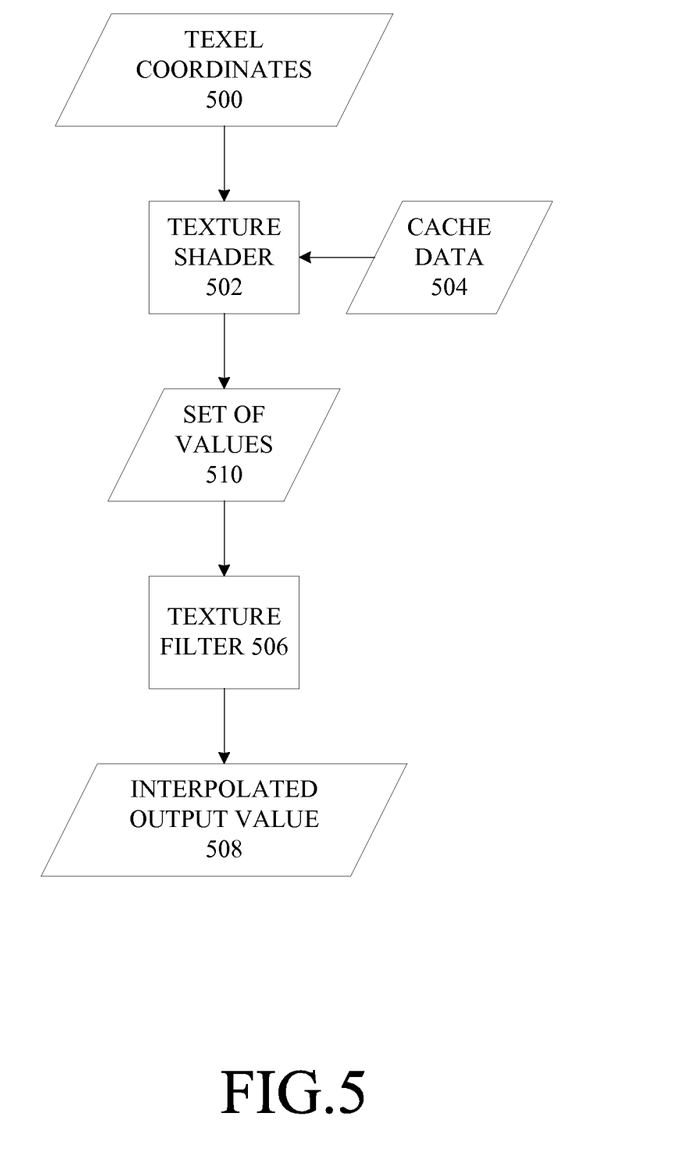
FIG. 5 is a data flow diagram of an example implementation of using a procedural texture with a weighted blending of texels.

As shown in FIG. 5, texel coordinates 500 may represent an intermediate value between actual values produced by the texel shader 502. The texel shader 502 accesses the surrounding values from the cache 504 and provides the set of values 510 to the texture filter 506, which interpolates them to provide the interpolated output value, as indicated at 508.

As an example of refactoring, diffuse lighting can often be represented as a function which takes a normal vector as input. The diffuse lighting equation can be factored into a procedural cube texture. The results of diffuse lighting computations using a procedural texture can be shared among neighboring pixels and interpolation of cached values can be used to provide the desired results. The resolution of the cube texture determines the frequency at which the diffuse lighting equation is computed, thus the frequency of computation is decoupled from screen resolution.

Another example of refactoring is noise, such as a Perlin noise function. Noise functions typically do not contain high-frequency components, by construction. Noise can be represented as a procedural texture, whether 1-dimensional, 2-dimensional or 3-dimensional. The results of the noise computation implemented as a procedural can be shared among neighboring pixels and interpolation of cached values can be used to provide the desired results.

Another example of refactoring is shadow mapping with soft shadows. Soft shadows also do not contain high-frequency components, by construction. A filtered shadow map can be represented as a three-dimensional procedural texture. The results of a shadow mapping computation implemented as a procedural texture can be shared among neighboring pixels and interpolation of cached values can be used to provide the desired results.

Another example application for procedural textures is rendering of tessellated three-dimensional objects of multiple small triangles to which a texture is applied, called surface shading. When the average triangle size becomes small, per pixel computation performed in a graphics pipeline can be invoked many times per triangle even though each triangle may have an area of much less than a pixel. The rendering operations can be refactored so that certain computations are moved from the pixel shader into procedural textures. Thus, computations performed for one triangle can be shared with other neighboring triangles through the cache and automatic texture filtering.

Another example application for procedural textures is color management. Color management involves applying a three-dimensional function to every pixel in an image so that the image, when presented on different output devices, has colors that are consistent among the output devices. Such a function is unique for each output device, and maps an input color to an output color to be used by that output device. This map can be implemented as a procedural texture, using caching of texel shader results and texture filtering to improve performance.

Another example application for procedural textures is custom compression formats for textures. Graphics runtime libraries and graphics processors generally support a limited number of compression formats for textures. In particular, a texture may be stored in one of these supported, compressed formats. When the compressed texture is read from memory, the processor or runtime library accesses the texture through a decoder. If an unsupported compression format is used, in a conventional system, then the decoder is implemented as a program executed by the GPU, which then generates texture data without using texture filtering operations. By using a procedural texture, an application developer can write a decompression function as part of the texel shader, which is invoked by the texture filtering operations on demand.

Another example application for procedural textures is implementing image effect graphs. Imaging effects are commonly represented as effect graphs. An effect receives image data as an input and provides image data as an output. Multiple effects are interconnected as a graph so that the output of one effect is the input to another effect. Typically, an effect graph is implemented using a graphics processor to apply each effect to its input data, and to store intermediate results corresponding to each edge of the effect graph in main memory. Such an implementation consumes significant memory and bandwidth. Using procedural textures, a texel shader is enabled to recursively sample from one or more procedural textures. Thus an effect graph can be mapped to a graph of procedural textures. Each edge (i.e., an intermediate image) in the effect graph corresponds to one procedural texture; each vertex (i.e., an effect) in the graph corresponds to one texel shader. Such an implementation enables an effect graph to be implemented on a graphics processor without using any off-chip memory, eliminating use of memory bandwidth for intermediate results.

There are numerous advantages to using procedural textures that share results through a cache.

For example, procedural textures also can be used to implement multiresolution rendering by a GPU. Current GPUs are designed to render (at least lighting effects) at a single spatial frequency, typically that of the screen pixels. However, some portions of the rendering algorithm represent effects that have higher special frequencies, and other terms have only lower spatial frequencies. For example, specular highlights may operate at frequencies higher than the screen rate, while diffuse lighting may operate at a frequency substantially lower than the screen rate. Processing information at a rate higher than necessary wastes performance and power that could be used for some other effect or for a higher frame rate. Processing information at a rate lower than necessary produces visual artifacts. A procedural texture provides a mechanism that enables a GPU to process different terms at different frequencies. A mip level of detail parameter (MIP LOD) can be used to select the spatial frequency, resolution or rate. Using the cache, data stored at a different rate is stored and eliminated redundant work. The built in linear blending and filtering capability merges new results at the base rate with minimal artifacts. It also has a linear blending/filtering capability that can smoothly blend the results from different rates back into the base rate. In one aspect, a procedural texture extends existing texture sampling in GPUs so that they contain a programmable element called a texel shader.

For example, results that are provided to different threads are consistent and are not subject to race conditions and deadlocks. By relying on the cache for sharing data, and cache hits and misses to invoke processing of a texel shader, an application developer does not implement synchronization among threads. Such synchronization otherwise could lead to race conditions, deadlocks and the like.

There are no restrictions on how much parallelism can be employed by the underlying implementation.

The cache can be implemented at any level in a memory hierarchy in which data sharing can occur. For example, some implementations may only cache procedural textures in L1 caches, thus requiring no bandwidth from higher level caches. At another extreme, implementations may cache procedural textures in all levels of the memory hierarchy including in main memory. Such an architecture enables implementations to spend memory bandwidth to save computation, or vice versa.

Various techniques can be used to provide a developer with the ability to control the level of persistence of texel shader results. For example, a texel shader can be programmed so that data is always saved in main memory, never saved in main memory, or saved in main memory dependent on other conditions, such as may be indicated by an application. There are several ways to implement this choice. For example, the choice can be a property programmed into a texel shader, or can be a property of a texel shader that is coded into an application program, or can be a property of a texel shader that is dynamically set by an application at runtime. Thus, an application or a texel shader can indicate whether texel shader invocations are saved permanently in main memory after executing, instead of only storing data in a cache from which it can be evicted. This persistent storage would be helpful if an application has sufficient available memory and is likely to revisit many texel shader results, perhaps over multiple frames of rendering.

With texture filtering built into hardware for a texture processing pipeline, shared results can be readily interpolated.

Finally, because texel shaders are evaluated on-demand, texel shaders are only invoked where needed, and thus only the necessary shared data is computed.

Any or all of the aforementioned alternate embodiments described herein may be used in any combination desired to form additional hybrid embodiments. It should be understood that the subject matter defined in the appended claims is not necessarily limited to the specific implementations described above. The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101. The specific implementations described above are disclosed as examples only.

What is claimed is:

1. A computer comprising:
   a memory storing instructions implementing a texel shader, wherein the instructions, when executed by a thread on a graphics processing unit, compute a color value of a pixel of a texture by evaluating a function applied to quantized texture coordinates for the pixel; and
   a graphics processing unit processing multiple concurrent threads, the multiple concurrent threads executing at least the instructions implementing the texel shader to apply the texel shader to quantized texture coordinates to compute color values for pixels of the texture;
   a texture cache accessible by and shared among the multiple concurrent threads;
   wherein the multiple concurrent threads executed on the graphics processing unit store results of applying the texel shader in the texture cache, the results comprising the color values of pixels of the texture computed by evaluating the function applied to quantized texture coordinates; and
   wherein, to apply the texture from the texture cache to a pixel for an object, each thread of the multiple concurrent threads executed on the graphics processing unit:
      in response to determining that results of applying the texel shader to quantized texture coordinates corresponding to the pixel are in the texture cache, accesses color values for the quantized texture coordinates from the texture cache, and,
      in response to determining that results of applying the texel shader to the quantized texture coordinates corresponding to the pixel are not in the texture cache, applies the texel shader to the quantized texture coordinates corresponding to the pixel to compute the color values for the quantized texture coordinates, and stores the computed color values for the quantized texture coordinates in the texture cache; and
      applies the color values for the quantized texture coordinates from the texture cache to the pixel for the object.

2. The computer of claim 1 further comprising a texture filtering component comprising an input to receive the results from the texel shader and performing a weighted blending of the results to provide an output.

3. The computer of claim 1 wherein the texel shader is implemented in a high level shader language.

4. The computer of claim 1 wherein texture parameters comprise dimension, size, and texel format.

5. The computer of claim 1 wherein the texture cache is implemented in a main memory of the computer.

6. The computer of claim 5, wherein texture data produced from an invocation of the texel shader is stored in a cache line of the texture cache.

7. The computer of claim 1, wherein the texture cache is implemented using a page table, and wherein, in response to a page fault when one of the multiple concurrent threads requests texture data from a page, the one of the multiple concurrent threads invokes the texel shader to generate and stores texture data for the page.

8. An article of manufacture comprising:
   a computer storage medium;
   computer program instructions stored on the computer storage medium which, when processed by a computer, configure the computer to be comprising:
   a rendering engine executed on a processing unit and receiving instructions defining a texel shader, wherein the instructions, when executed by a thread on a graphics processing unit, compute a color value of a pixel of a texture by evaluating a function applied to quantized texture coordinates for the pixel, and processing the texel shader in multiple concurrent threads on a graphics processing unit of the computer to generate texture data for each of the multiple concurrent threads;
   a texture cache accessible by and shared among the multiple concurrent threads and in which texture data is stored; and
   wherein the multiple concurrent threads executed on the graphics processing unit store results of applying the texel shader in the texture cache, the results comprising the color values of pixels of the texture computed by evaluating the function applied to quantized texture coordinates; and
   wherein, to apply the texture from the texture cache to a pixel for an object, each thread of the multiple concurrent threads executed on the graphics processing unit:
      in response to determining that results of applying the texel shader to quantized texture coordinates corresponding to the pixel are in the texture cache, accesses color values for the quantized texture coordinates from the texture cache, and,
      in response to determining that results of applying the texel shader to the quantized texture coordinates corresponding to the pixel are not in the texture cache, applies the texel shader to the quantized texture coordinates corresponding to the pixel to compute the color values for the quantized texture coordinates, and stores the computed color values for the quantized texture coordinates in the texture cache; and applies the color values for the quantized texture coordinates from the texture cache to the pixel for the object.

9. The article of manufacture of claim 8, wherein the renderer further comprises a texture filtering component that receives results from the texel shader and performs an interpolation function using the results to provide an interpolated output.

10. The article of manufacture of claim 8 wherein the texture cache is implemented in memory and wherein texture data produced from an invocation of the texel shader is stored in a cache line.

11. The article of manufacture of claim 8 wherein the texture cache is implemented using a page table, and wherein texture data is produced in response to a page fault, using the texel shader to generate and store texture data for a page of data.

12. An article of manufacture comprising:
a computer storage medium;
computer program instructions stored on the computer storage medium which, when processed by a computer, configure the computer to be comprising a graphics runtime library, the graphics runtime library comprising:
an interface for an application program executed on the computer to support manipulation of procedural textures, a procedural texture including instructions implementing a texel shader, wherein the instructions, when executed by a thread on a graphics processing unit, compute a color value of a pixel of a texture by evaluating a function applied to quantized texture coordinates for the pixel; and
an interface for a renderer executed on the computer to render procedural textures, the renderer causing multiple concurrent threads to be executed on a graphics processing unit of the computer and storing, in a texture cache, texture data produced by the multiple concurrent threads from rendering the procedural textures, wherein the texture data comprises the color values for pixels of the texture computed by evaluating the function applied to quantized texture coordinates; and
wherein, to apply the texture from the texture cache to a pixel for an object, each thread of the multiple concurrent threads executing on the graphics processing unit:
in response to determining that results of applying the texel shader to quantized texture coordinates corresponding to the pixel are in the texture cache, accesses color values for the quantized texture coordinates from the texture cache, and,
in response to determining that results of applying the texel shader to the quantized texture coordinates corresponding to the pixel are not in the texture cache, applies the texel shader to the quantized texture coordinates corresponding to the pixel to compute the color values for the quantized texture coordinates and stores the computed color values for the quantized texture coordinates in the texture cache; and
applies the color values for the quantized texture coordinates from the texture cache to the pixel for the object; and
an interface for the texture cache for caching the texture data produced from rendering the procedural textures by the multiple concurrent threads executing on the graphics processing unit, wherein the texture cache is accessible by and shared among the multiple concurrent threads of the renderer.

13. The article of manufacture of claim 12, wherein the renderer includes a graphic processing unit.

14. The article of manufacture of claim 13, wherein the texture cache resides in the graphic processing unit.

15. The article of manufacture of claim 12, wherein the renderer is implemented using a computer program processed by a central processing unit of a computer.

16. The article of manufacture of claim 15, wherein the texture cache is a page table for the central processing unit.

17. The article of manufacture of claim 15, wherein the texture cache resides in main memory of the computer.

18. The article of manufacture of claim 12, wherein the renderer comprises a texture filtering component that receives results from a texel shader and performs an interpolation function using the results to provide an interpolated output.

19. The article of manufacture of claim 12 wherein the texel shader is implemented in a high level shader language.

20. The article of manufacture of claim 12 wherein texture parameters comprise dimension, size, and texel format.

* * * * *